US007231230B2

United States Patent
Yoshikawa (10) Patent No.: US 7,231,230 B2
(45) Date of Patent: Jun. 12, 2007

(54) MOBILE TELEPHONE SET CAPABLE OF ALTERING KEY LAYOUT THEREOF AND MOBILE TELEPHONE SYSTEM INCLUDING THE SAME

(75) Inventor: Ken Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 498 days.

(21) Appl. No.: 10/160,110

(22) Filed: Jun. 4, 2002

(65) Prior Publication Data

US 2003/0129976 A1 Jul. 10, 2003

(30) Foreign Application Priority Data

Jun. 4, 2001 (JP) ............................. 2001-167846

(51) Int. Cl.
*H04B 1/38* (2006.01)
*H04M 1/00* (2006.01)
*G09G 5/00* (2006.01)

(52) U.S. Cl. ...................................... 455/566; 345/581

(58) Field of Classification Search ................ 455/419, 455/566; 715/749; 463/37; 400/472; 719/328; 717/118; 345/169, 581, 619, 173
See application file for complete search history.

(56) References Cited

U.S. PATENT DOCUMENTS

| 5,422,656 | A  | * | 6/1995 | Allard et al. ................ 455/566 |
| 5,949,348 | A  | * | 9/1999 | Kapp et al. .................... 340/5.4 |
| 6,004,049 | A  | * | 12/1999 | Knox .......................... 400/89 |
| 6,208,336 | B1 | * | 3/2001 | Carter ......................... 715/866 |
| 6,301,626 | B1 | * | 10/2001 | Knox ........................... 710/10 |
| 6,717,593 | B1 | * | 4/2004 | Jennings ...................... 715/760 |
| 6,721,578 | B2 | * | 4/2004 | Minear et al. ............... 455/566 |
| 7,020,882 | B1 | * | 3/2006 | Lewallen ..................... 719/328 |
| 2001/0035859 | A1 | * | 11/2001 | Kiser et al. ................. 345/173 |
| 2002/0035595 | A1 | * | 3/2002 | Yen et al. .................... 709/203 |
| 2002/0075300 | A1 | * | 6/2002 | Tang et al. ................. 345/744 |
| 2002/0093535 | A1 | * | 7/2002 | Murphy ...................... 345/764 |
| 2003/0071792 | A1 | * | 4/2003 | Safadi ........................ 345/169 |
| 2003/0074647 | A1 | * | 4/2003 | Andrew ....................... 717/100 |
| 2004/0038740 | A1 | * | 2/2004 | Muir ........................... 463/40 |
| 2004/0087347 | A1 | * | 5/2004 | Minear et al. ............... 455/566 |

FOREIGN PATENT DOCUMENTS

| JP | A 10-271562 | 10/1998 |
| WO | 01/75667 A1 | 10/2001 |

* cited by examiner

*Primary Examiner*—William Trost
*Assistant Examiner*—Marivelisse Santiago-Cordero
(74) *Attorney, Agent, or Firm*—Young & Thompson (57) ABSTRACT

A mobile telephone switching network 3, a server 5, and a terminal equipment 7 are connected to a network 4. A portable telephone set 2 manufactured by a manufacturer 1 is connected to the mobile telephone switching network 3. Not only a service application fabricated by an application maker 6 but also a key application determining a key layout based on API published by the manufacturer 1 are uploaded to the server 5. The service and the key applications are downloaded to the portable telephone set 2 in response to a requirement from the portable telephone set 2. In the portable telephone set 2, the service application is analyzed by using the key application downloaded as mentioned above. The key layout is then determined by analyzing the service application. The key layout is displayed on the liquid crystal display of the portable telephone set 2.

4 Claims, 7 Drawing Sheets

MOBILE TELEPHONE SET CAPABLE OF ALTERING KEY LAYOUT THEREOF AND MOBILE TELEPHONE SYSTEM INCLUDING THE SAME

BACKGROUND OF THE INVENTION

The present invention relates to a mobile telephone set and a mobile telephone system, in particular to a mobile telephone set capable of altering key layout on the mobile telephone set, responsive to application program downloaded to the mobile telephone set, and a mobile telephone system including such a mobile telephone set.

Such a mobile telephone set includes a portable telephone set, a PHS (Personal Handy phone System) telephone set, a PDA (Personal Digital Assistant) terminal equipment having radio telephony function, and an automobile telephone set, and the like. Among these mobile telephone sets, particularly, the portable telephone set and the PHS telephone set have been rapidly progressed on the ground that portability of the portable and the PHS telephone sets have been improved by being made more compact and more light, that the portable and the PHS telephone sets have been rendered to have a multi-function, that the charge for a telephone call by the portable and the PHS telephone sets have been reduced, and the like. As an example of PHS having such a multi-function, unexamined Japanese patent publication Hei 10-271562, namely, No. 271562/1998 discloses a constitution that a game software can be downloaded from data base station to the PHS.

In an operating portion of the portable telephone set or the PHS telephone set, numeral buttons (keys), symbols, and function buttons (keys) are located together in a front surface of the body portion thereof. However, it is difficult to obtain a space for increasing numbers of the buttons (or keys), because of necessity for maintaining that the portable and the PHS telephone sets are made more compact and more light. Under the circumstances, requirement for the multi-function is tried to be achieved by assigning a plurality of functions to a single key. On the other hand, keys are located mainly in order to achieve dial function as a telephone set. As a result, the numerals keys 0 to 9 are located similarly to a conventional telephone set. The other buttons (keys) are variously located, dependent on design policy per each manufacture.

However, in a conventional mobile telephone set, a layout of the buttons are determined, when the conventional mobile telephone set is designed by the manufacture. In addition, the buttons themselves are merely located on the conventional mobile telephone set as parts of the conventional mobile telephone set. It is therefore impossible to alter the layout of the buttons after the conventional mobile telephone set has been manufactured. As a result, according to an application program, such as i-mode, and the like, it is caused to occur that a user of the conventional mobile telephone set cannot push the buttons easily. Thus, operability by the user is deteriorated. Further, it becomes difficult for the manufacture to develop such an application program.

On the other hand, in spite of such physical buttons, a mobile telephone set having an operating portion consisting mainly of a liquid crystal display and touch sensors combined therewith has come to be in sale recently. In this mobile telephone set, it is possible to change correspondence between each touch sensor and each function by altering a mode of the mobile telephone set with respect to functions developed by the manufacture themselves. However, the button layout thereof cannot be altered in response to each application program provided by an application program maker through a network, after a user has obtained the mobile telephone set.

SUMMARY OF THE INVENTION

It is therefore an object of the present invention to provide a mobile telephone set which is capable of determining an optimized key layout thereof responsive to an application program used in the mobile telephone set.

It is another object of the present invention to provide a mobile telephone system which includes the mobile telephone set of the type described and which is capable of determining an optimized key layout of the mobile telephone set responsive to an application program used in the mobile telephone system.

Other objects of the present invention will become clear as the description proceeds.

According to an aspect of the present invention, there is provided a mobile telephone system comprising: a network; a mobile telephone set which is capable of being connected to said network; a server which is connected to said network and which stores a key application determining, based on a service application fabricated by an application maker and API (Application Programming Interface) published by a manufacturer manufactured said mobile telephone set, API and a key layout regarding keys of said service application; said mobile telephone set making an access to said server, so that, said service application and said key application are downloaded to said mobile telephone set, and analyzing said service application by said key application to determine a key layout, and displaying the determined key layout on a display.

The mobile telephone set may be a portable telephone set, a PHS (Personal Handy phone System) telephone set, an automobile telephone set, and a PDA (Personal Digital Assistant) terminal equipment having radio telephony function.

According to another aspect of the present invention, there is also provided a mobile telephone set comprising: a housing having an operating surface; a touch panel which is located on said operating surface of said housing; a liquid crystal display which is overlapping with said touch panel partially or as a whole; a control section which carries out a function for making an access to a server connected to a network to make a service application and a key application to be downloaded from said server to said mobile telephone set, said key application determining API (Application Programming Interface) and a key layout regarding keys of said service application; and said control section further carrying out a function for analyzing said service application by said key application to determine a key layout and for displaying the determined key layout on said liquid crystal display.

The liquid crystal display may have a size which ranges a substantially whole area of said housing having said operating surface.

Figure 1:
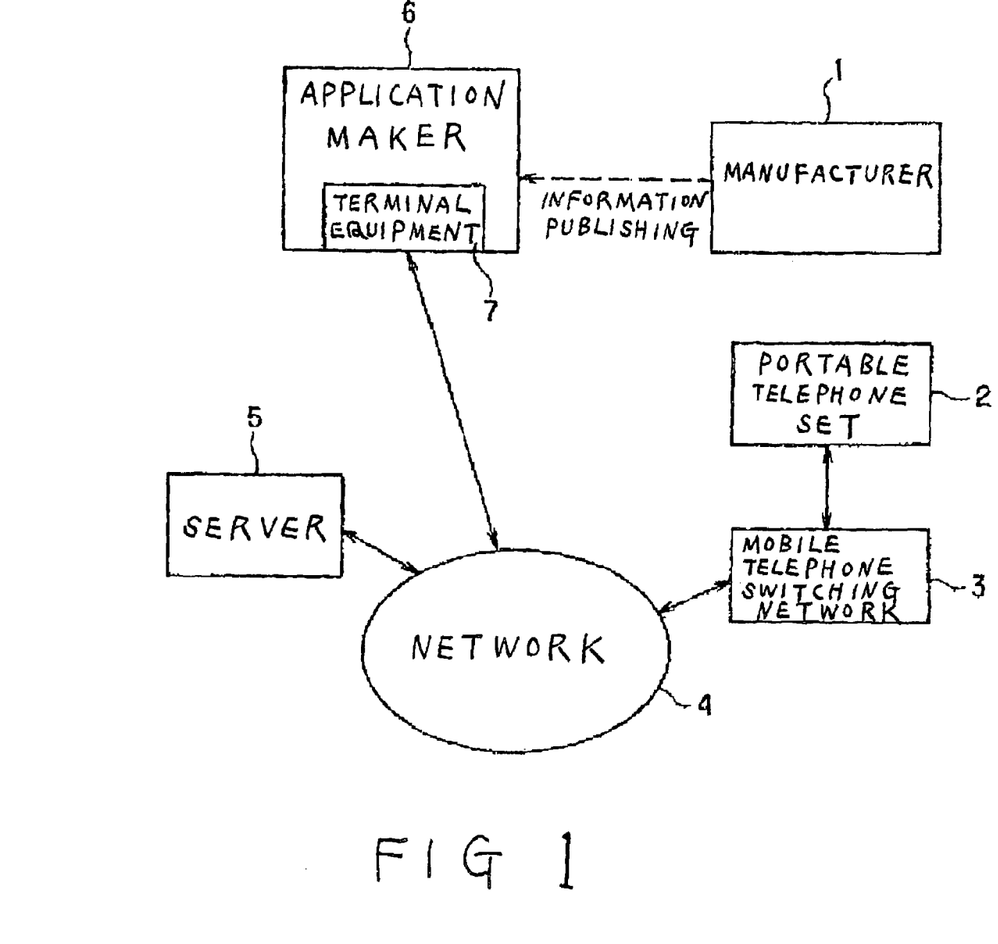
FIG. 1 is a block diagram for schematically showing a mobile telephone system and a mobile telephone set according to a preferred embodiment of the present invention.
Figure 2:
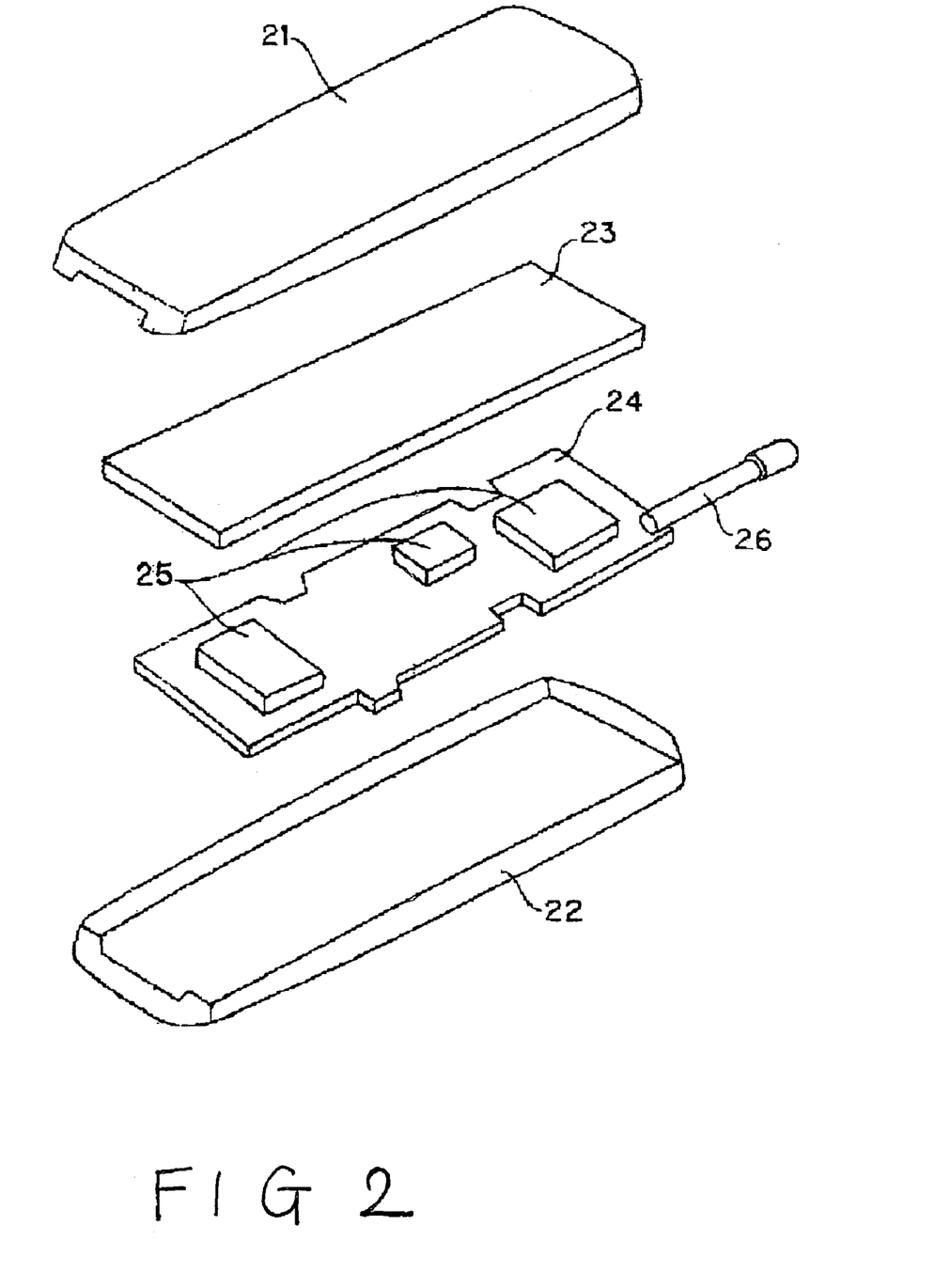
FIG. 2 is a perspective view for schematically showing the mobile telephone set illustrated in FIG. 1.

DESCRIPTION OF THE PREFERRED EMBODIMENTS:

Referring to FIGS. 1 and 2, description will proceed to a mobile telephone system and a mobile telephone set according to a preferred embodiment of the present invention. FIG. 1 is a block diagram for schematically showing the mobile telephone system and the mobile telephone set according to the preferred embodiment of the present invention. Hereunder, description is made about a case that a portable telephone set is used as the mobile telephone set according to the preferred embodiment of the present invention.

As illustrated in FIG. 1, the mobile telephone system according to the preferred embodiment of the present invention comprises a portable telephone set 2 manufactured by a manufacturer 1, a mobile telephone switching network 3 connected to the portable telephone set 2 by wireless, a network 4 connected to the mobile telephone switching network 3, a server 5 connected to the network 4, and a terminal equipment 7 which is connected to the network 4 and which is located in an application maker 6. In FIG. 1, one manufacturer 1, one portable telephone set 2 and one application maker 6 is depicted, respectively. However, the mobile telephone system according to the present invention may comprise a plurality of manufacturers 1, a plurality of portable telephone sets 2 and a plurality of application makers 6.

It is assumed that the manufacturer 1 publishes API (Application Programming Interface: a specification of an interface for getting access to various hardware or software resources and a system function of OS [Operating System ] utilized by a software program, when the software program is fabricated) of the portable telephone set 2 manufactured by the manufacturer 1 themselves and a method of constructing a key application thereof for the application makers 6.

The portable telephone set 2 has not only a function for making JAVA (a programming language and technology suite developed by Sun Microsystems, United States; a registered trademark developed by Sun Microsystems, United States) application (Hereunder, called a service application) be downloaded from the server 5 to the portable telephone set 2 through the network 4 but also a function for carrying out an application (Hereunder, called a key application) for analyzing the service application downloaded thereto and thereby determining a key layout and displaying the determined key layout on a liquid crystal display.

The key application is such a one that API for keys and the key layout are determined. By being downloaded to the portable telephone set 2 to be incorporated therein, a touch panel corresponding to a related service application is embodied in the portable telephone set 2. The key application is downloaded to the portable telephone set 2 together with the service application. The service application includes a software module mounted therein which analyzes signals input from the touch panel and which is cap able of calling API published by the manufacturer 1. On the other hand, the portable telephone set 2 has a system area in a display to return the key layout, when a started service application is not terminated normally. Namely, the portable telephone set 2 has a function of the system area capable of forcibly terminating the started service application by operating the touch panel on the display.

The server 5 stores not only the service application fabricated by the application makers 6 but also the key application which is for the service application and which has been uploaded from the terminal equipment 7 to the server 5. The service application and the key application are downloaded to the portable telephone set 2 in response to an access from the portable telephone set 2.

FIG. 2 schematically shows a constitution of the portable telephone set 2. As illustrated in FIG. 2, a housing of the portable telephone set 2 comprises a front surface transparent cover 21 and a back surface cover 22. A liquid crystal display 23 having a large size is located inside of the front surface transparent cover 21. A print substrate 24 is located between the liquid crystal display 23 and the back surface cover 22. The print substrate 24 comprises a plurality of electronic parts 25, and an antenna 26 are mounted in the print substrate 24. Transparent sensors (not shown) for a touch panel are formed in the front surface transparent cover 21. The transparent sensors (not shown) function as operating buttons. Not only the system but also the service applications downloaded to the portable telephone set 2 can be started by operating the touch panel. Further, the liquid crystal display 23 has a size which ranges a substantially whole area of the front surface transparent cover 21.

Figure 3:
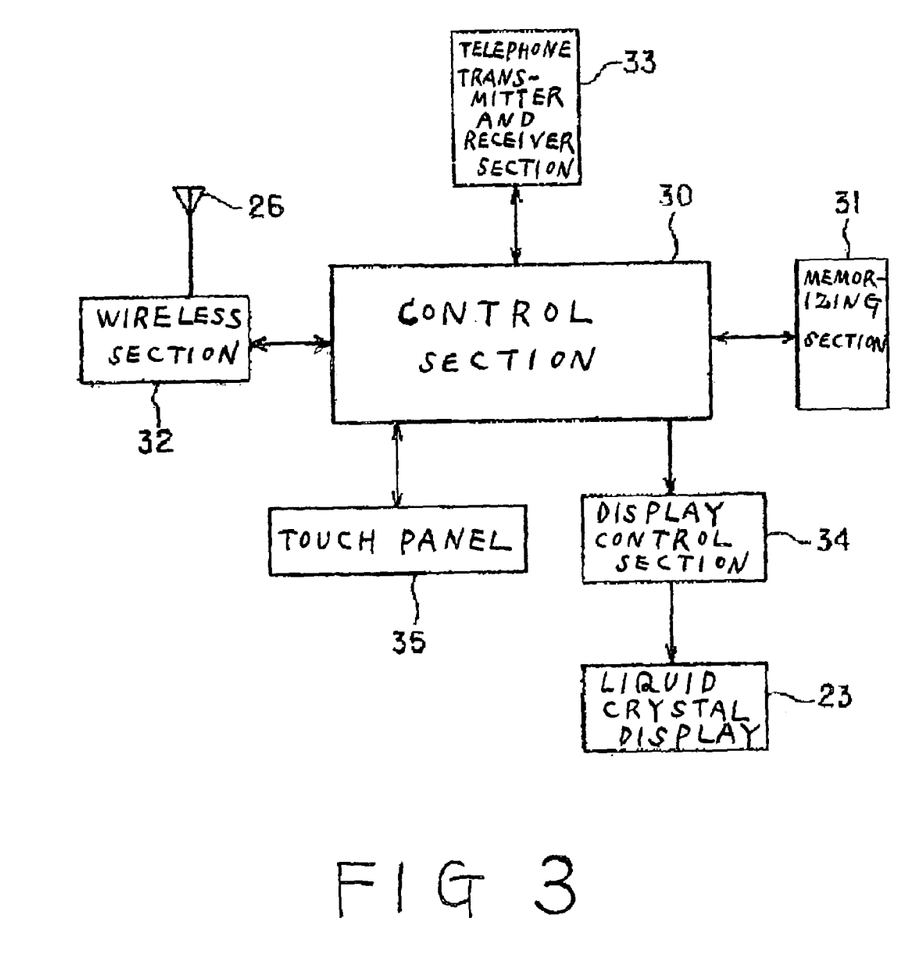
FIG. 3 is a block diagram for schematically showing an electrical constitution of the mobile telephone set illustrated in FIG. 1.

FIG. 3 schematically shows an electrical constitution of the portable telephone set 2. As illustrated in FIG. 3, the portable telephone set 2 comprises the liquid crystal display 23, the antenna 26, a control section 30 which controls whole of the electrical constitution and which carries out the service application and the key application both according to the present invention, a memorizing section 31 which stores programs to be carried out by the control section 30, the downloaded service and key applications, and the other processed data, telephone directory data, and the like, a wireless section 32 which is connected to the control section 30 and which forms a wireless circuit with the mobile telephone switching network 3 to transmit signals thereto or receive signals therefrom, a telephone transmitter and receiver section 33 which outputs an audible tone by input and reception of voice, and the like, a display control section 34 which controls the liquid crystal display 23 to conduct a display of contents of operating the buttons, a display of touch panel based on the key application, and the other various displays based on indication from the control section 30, and the touch panel 35 for operating conduct of the service application, inputting a name and a telephone number of destination at the time of calling, registering the name and the telephone number in the telephone directory, and the like.

Figure 4:
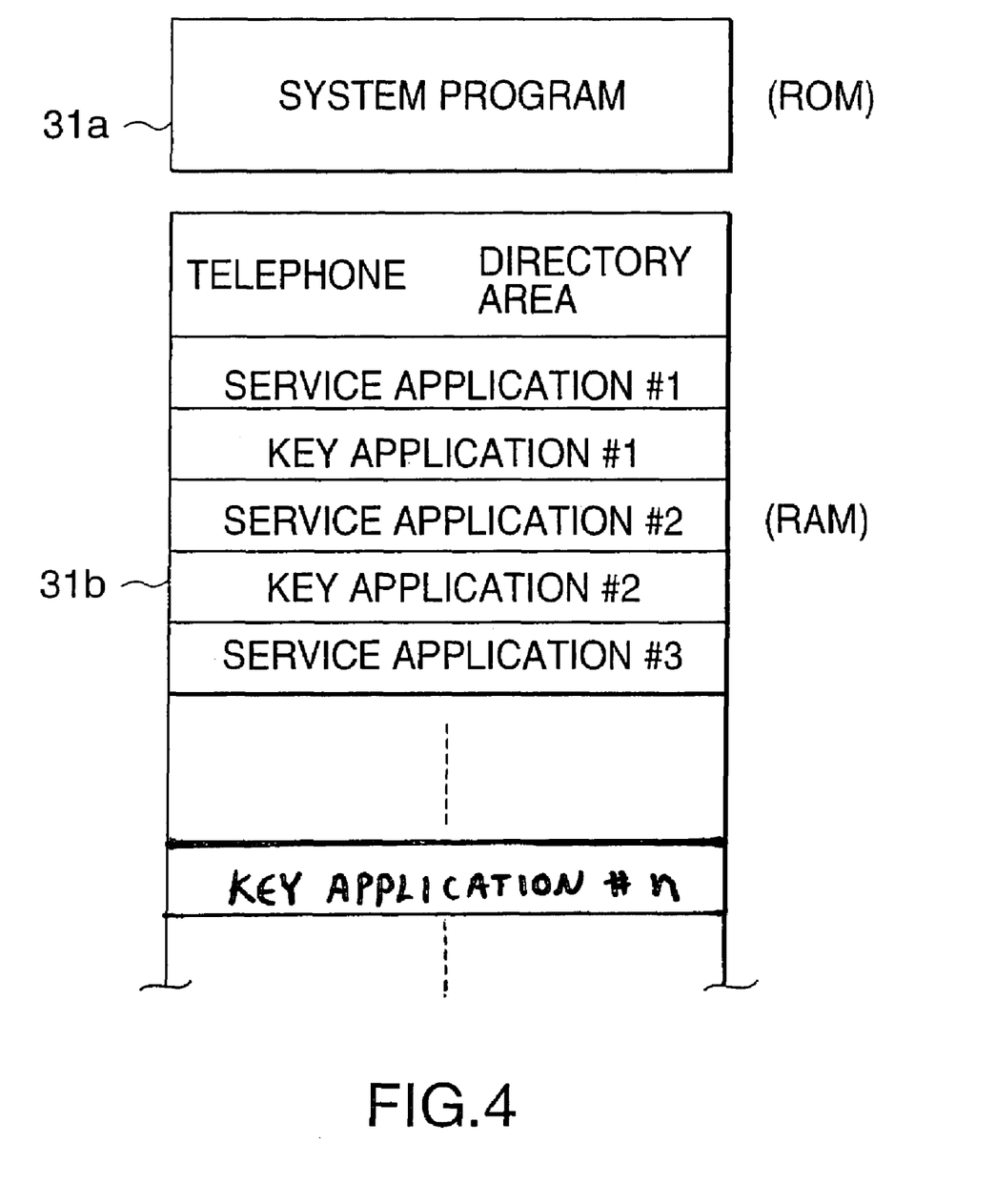
FIG. 4 is a constitutional-view for schematically showing a memorizing section of the mobile telephone set illustrated in FIG. 3.

FIG. 4 schematically shows a constitution of the memorizing section 31. As illustrated in FIG. 4, the memorizing section 31 comprises ROM 31a and RAM 31b. A system program is stored in the ROM 31a. On the other hand, RAM 31b has storing areas consisting of a telephone directory area, a service application No. 1, a key application No 1, a service application No. 2, a key application No. 2, a service application No. 3, . . . . a key application No.n.

Figure 5:
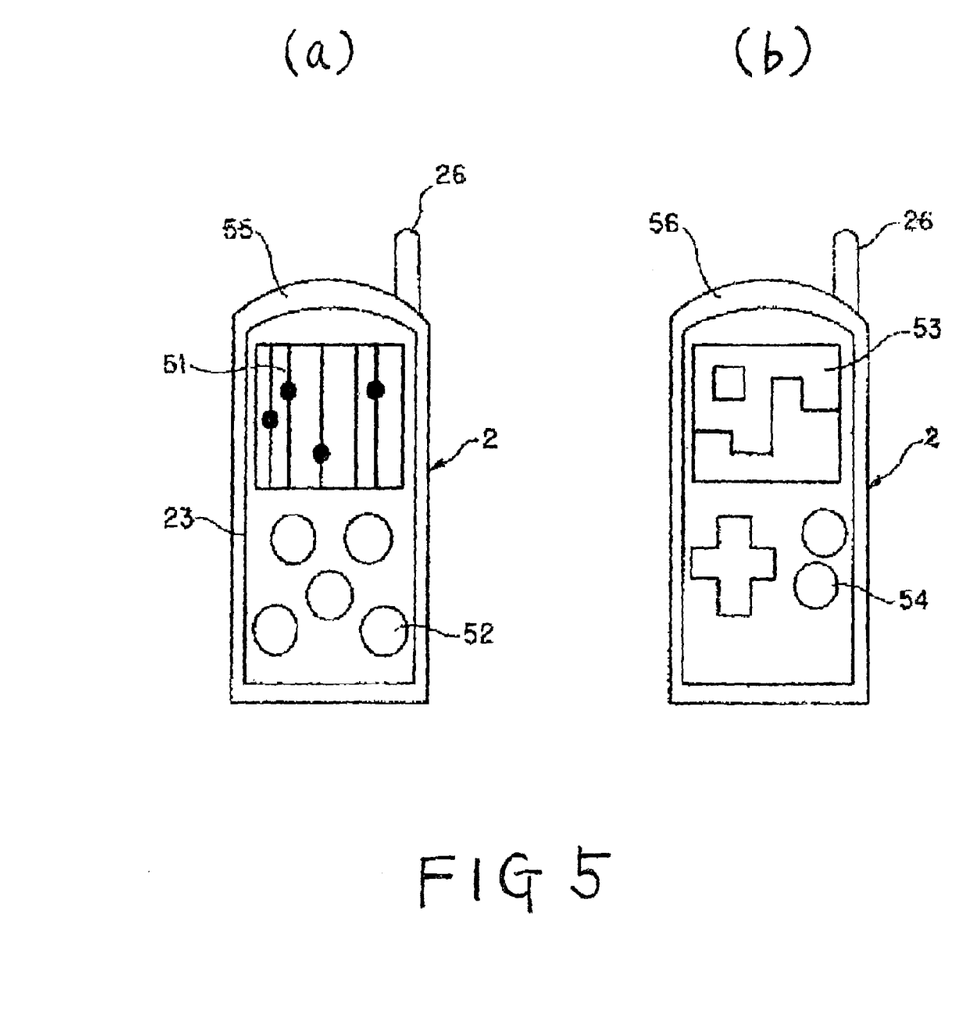
FIG. 5 is a front view for schematically showing the mobile telephone set in which a display layout is formed based on a key application downloaded to the mobile telephone set in a mobile telephone system according to the preferred embodiment of the present invention.

FIG. 5 schematically shows an example of the portable telephone set 2 in which a display layout is formed based on a key application downloaded from the server 5 to the portable telephone set 2. FIG. 5 (*a*) shows an example of a display layout 55 for displaying the operating section 52 that five circular buttons are located based on the key application No. 1 with correspondence to a display contents 51 by the service application No.1. On the other hand, FIG. 5 (*b*) shows an example of a display layout 56 for displaying the operating section 54 that two circular buttons and one cross-shaped button are located based on the key application No. 2 with correspondence to a display contents 53 by the service application No. 2.

Figure 6:
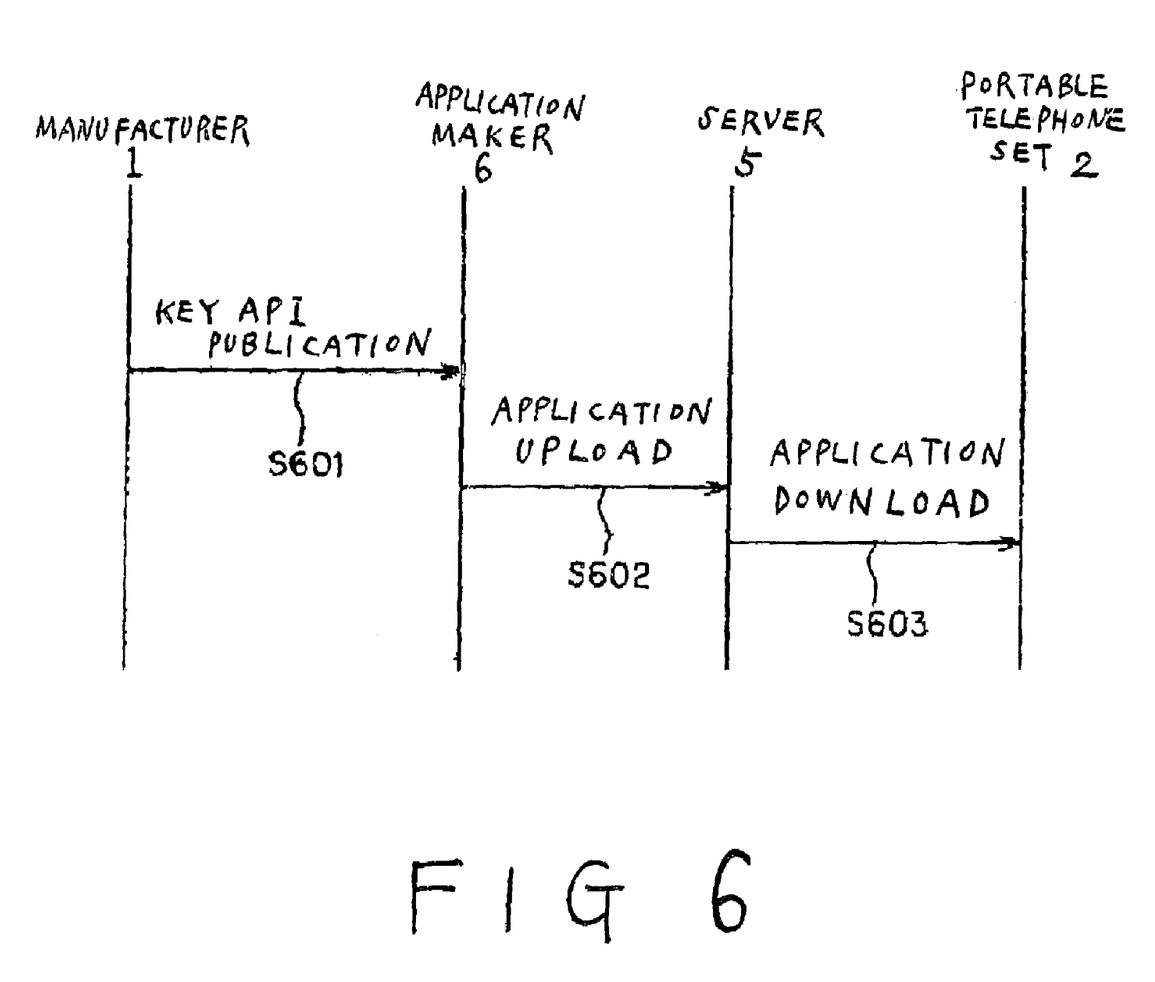
FIG. 6 is a timing chart for schematically showing an operation of the mobile telephone system according to the preferred embodiment of the present invention.
Figure 7:
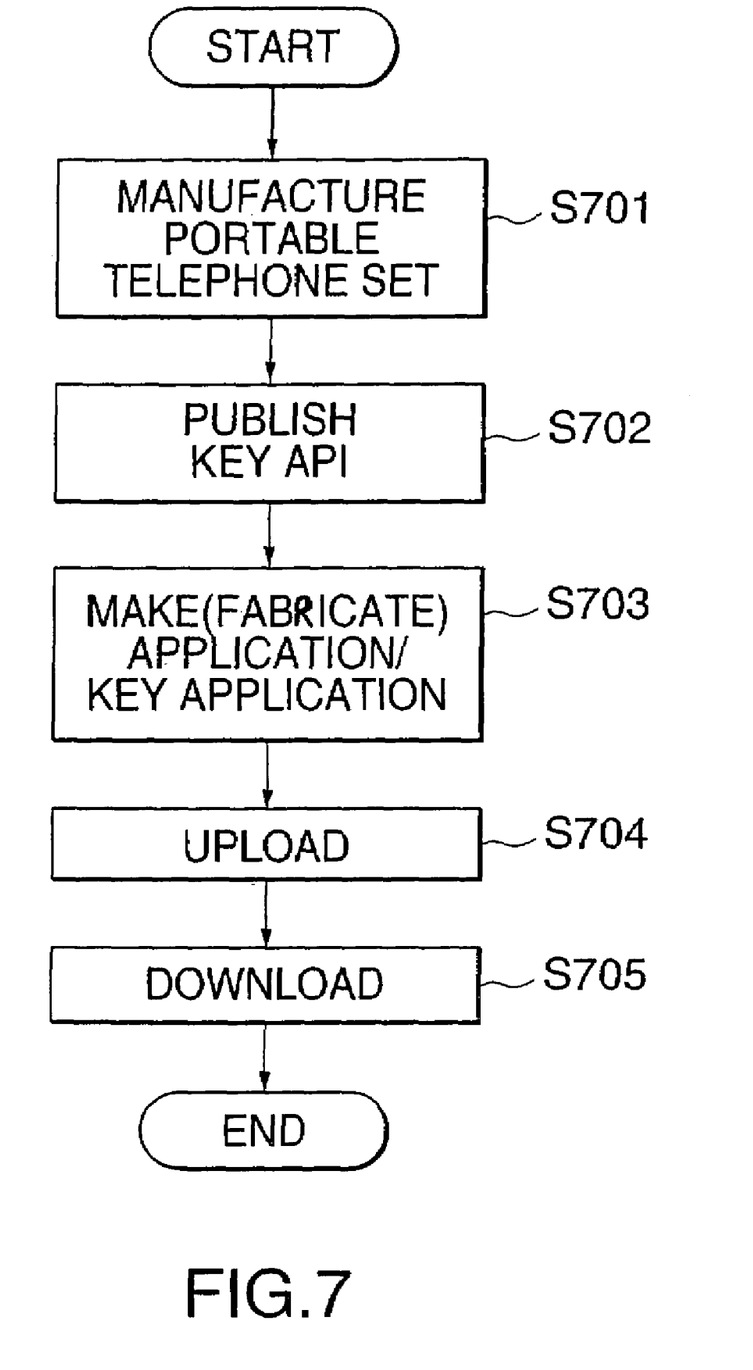
FIG. 7 is a flow chart for schematically showing an operation of the mobile telephone system according to the preferred embodiment of the present invention.

Now, referring to FIGS. 6 and 7 with reference to FIGS. 1 through 5 continued, description proceeds to an operation of the mobile telephone system according to the preferred embodiment of the present invention. FIGS. 6 and 7 show an operation of the mobile telephone system according to the preferred embodiment of the present invention. FIG. 6 is a timing chart for schematically showing the operation while FIG. 7 is a flow chart for schematically showing the operation. In FIGS. 6 and 7, each S is a step.

As illustrated in FIG. 7, in the manufacturer 1, programs for carrying out an application download function, a function for analyzing the key application to be displayed on a display, a touch panel type input function from the key application, a basic function for enabling the portable telephone set 2 to be operable as a telephone set, an electronic telephone directory function, or the like are loaded to the memorizing section 31 of the portable telephone set 2 (S 701).

Further, the manufacturer 1 publishes information concerning API for the keys of the portable telephone set 2 manufactured by the manufacturer 1 and a method of constructing a key application thereof for the application maker 6 (S 601, S 702). The application maker 6 makes a service application capable of operating in the portable telephone set 2 based on the information provided by the manufacturer 1. In addition, the application maker 6 determines location of keys used in the service application and fabricates a key application based on the determined location of keys (S 703). A software module is mounted in the key application to call API published by the manufacturer 1. The application maker 6 makes the completed service and key applications be uploaded to the server 5 together by the use of the terminal equipment 7 (S 602, S 704).

A user of the portable telephone set 2 gets access to the server 5 through the mobile telephone switching network 3 and the network 4 by using the portable telephone set 2. The user of the portable telephone set 2 thereby makes a desirable service application be downloaded from the server 5 to the portable telephone set 2, so that the downloaded service application is stored in the RAN 31b of the memorizing section 31 in the portable telephone set 2 (S 603, S 705). When the control section 30 in the portable telephone set 2 carries out the downloaded service application, the control section 30 starts a key application corresponding to the downloaded service application together. Accordingly, the control section 30 makes the display layout 55 and the display layout 56 both illustrated in FIG. 5 be displayed on the touch panel 35 of the liquid crystal display 23.

In a case that the service application thus started is terminated, the key application corresponding to the service application is also terminated. As a result, a key layout is returned to that of an initial condition. If the started service application is not terminated normally, it is possible to terminate the service application forcibly by operating the system area (by inputting by the touch panel from the system area) formed on a predetermined position of the display.

As described above, according to the mobile telephone system and the mobile telephone set of the preferred embodiment of the present invention, a service application fabricated by the application maker 6 and a key application determining API for the keys and a key layout are stored in the server 5. The stored service and key applications are downloaded to the portable telephone set 2 by getting access to the server 5 using the portable telephone set 2. In the portable telephone set 2, a key layout for the service application corresponding to the key application is determined by the control section 30. The determined key layout is displayed in the liquid crystal display 23. As a result, an optimized key layout for the service application used in the portable telephone set 2 comes to be incorporated automatically in the portable telephone set 2. Consequently, operability of the portable telephone set 2 can be so far improved. By this improvement of the operability of the portable telephone set 2, it becomes possible for the application maker 6 to increase frequency of using (the number of times of using) the service application by the users. Popularization of the service application can thereby be improved.

As will be clearly understood from the description mentioned above, according to the mobile telephone system of the preferred embodiment of the present invention, a service application fabricated by the application maker and a key application determining API for the keys and a key layout are stored in the server connected to a network. The stored service and key applications are downloaded to the portable telephone set by getting access to the server using the portable telephone set. In the portable telephone set 2, a key layout for the service application corresponding to the key application is determined to be displayed in the liquid crystal display. As a result, an optimized key layout for the service application used in the portable telephone set comes to be incorporated in the portable telephone set. Consequently, operability of the portable telephone set can be so far improved. By the improvement of the operability of the portable telephone set, it becomes possible for the application maker to increase frequency of using (the number of times of using) the service application by the users.

Further, according to the mobile telephone set of the preferred embodiment of the present invention, the mobile telephone set comprises a housing having an operating surface, a touch panel which is located on the operating surface of the housing, a liquid crystal display which is overlapping with the touch panel partially or as a whole, and a control section which carries out a function for making an access to a server connected to a network to make a service application and a key application be downloaded from the server to the mobile telephone set, the control section further carrying out a function for analyzing the service application by the key application to determine a key layout and for displaying the determined key layout on the liquid crystal display. When the service application is downloaded from the server to the mobile telephone set to be used therein, a key layout optimized for the service application is automatically determined, so that the determined key layout is displayed in the liquid crystal display. As a result, a key layout optimized for the service application used in the mobile telephone set comes to be incorporated in the mobile telephone set. Consequently, operability of the mobile telephone set can be so far improved, when the service application is used in the mobile telephone set.

While this invention has thus far been described in conjunction with a preferred embodiment thereof, it will now be readily possible for one skilled in the art to put this invention into effect in various other manners. For example, the portable telephone set is described as the mobile telephone set in the above embodiment. However, the present invention can also be applied to the other mobile telephone set, if the mobile telephone set has a touch sensor capable of freely determining button or key layout by a software program, a function to get access to a server and an interface therefor. For example, the present invention can also be applied to a PHS (Personal Handy phone System) telephone set, an automobile telephone set, a PDA (Personal Digital Assistant) terminal equipment having radio telephony function, a personal computer having radio communication function, and the like.

What is claimed is:

1. A mobile telephone system comprising:
    a network;
    a mobile telephone set which is capable of being connected to said network;
    a server which is connected to said network and which stores a key application, said key application determining a key layout of keys of a corresponding service application;
    said mobile telephone set making an access to said server, so that said service application and said key application are downloaded to said mobile telephone set, said key application analyzing said service application to determine a physical position of the key layout, and displaying the determined physical position of the key layout on a display.

2. A mobile telephone system as claimed in claim 1, wherein said mobile telephone set is a portable telephone set, a PHS (Personal Randy phone System) telephone set, an automobile telephone set, or a PDA (Personal Digital Assistant) terminal equipment having radio telephony function.

3. A mobile telephone set comprising:
    a housing having an operating surface;
    a touch panel which is located on said operating surface of said housing;
    a liquid crystal display which is overlapping with said touch panel partially or as a whole;
    a control section which accesses a server connected to a network to download a service application and a corresponding key application from said server to said mobile telephone set, said key application determining an APT (Application Programming Interface) and a key layout regarding keys of said service application; and
    said control section enabling said key application to analyze said service application to determine a physical position of the key layout and for displaying the determined physical position of the key layout on said liquid crystal display.

4. A mobile telephone set as claimed in claim 3, wherein said liquid crystal display has a size which ranges a substantially whole area of said housing having said operating surface.

* * * * *